April 22, 1941.   H. A. CUTTING   2,239,192
YOKE AND SHAFT ASSEMBLY
Filed March 8, 1933
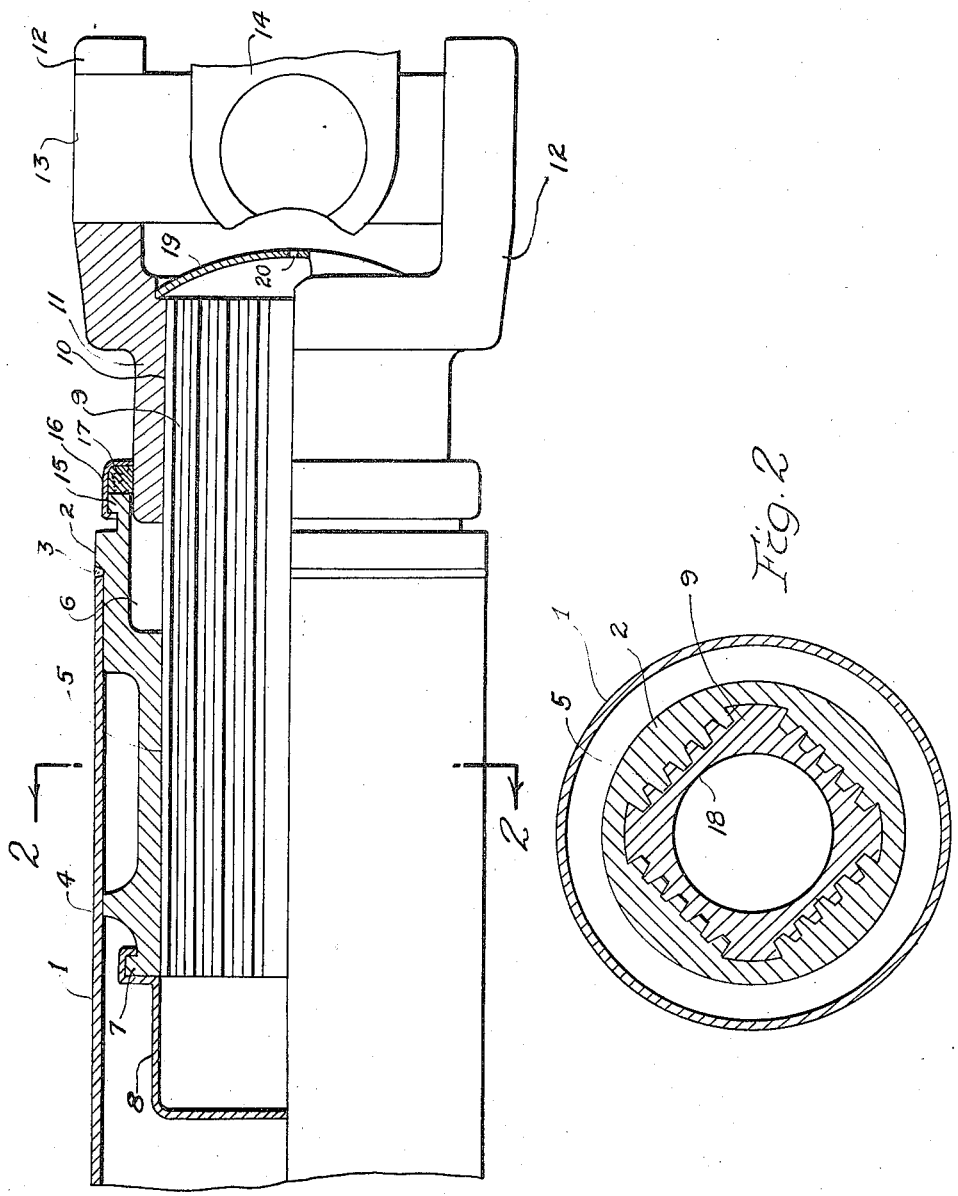
HERBERT A. CUTTING
INVENTOR.
BY
ATTORNEY.

Patented Apr. 22, 1941

2,239,192

UNITED STATES PATENT OFFICE 2,239,192

YOKE AND SHAFT ASSEMBLY

Herbert A. Cutting, Detroit, Mich., assignor to The Cutting Sales & Engineering Corporation, a corporation of Michigan Application March 8, 1938, Serial No. 194,636

9 Claims. (Cl. 64—1)

This invention relates to splined shaft assemblies such as are employed to connect a driving or propeller shaft and a universal joint yoke member and has for its object to provide an improved assembly incorporating self-lubricating features together with an arrangement of parts such that the splines are covered and hence protected from dirt and other extraneous matter.

Another object is to provide a shaft having internal splines inset into the end thereof, the space between the splines and the end of the shaft being enlarged to receive the shank of a universal joint yoke.

A further object is to provide an inset internal spline with enlarged outer end to receive a yoke shank in combination with oil seal means which will effectively seal the shaft and yoke against the entry of dirt and extraneous matter.

Another object is to provide an improved universal joint yoke comprising a hollow shank and trunnion arms, the shank receiving a shaft portion splined throughout its length, the splines thus remaining directly to and with the shank whereby when the yoke member is assembled with a shaft as above described the internal splines of the shaft need not be inset to any great extent into the shaft in order to provide a shaft end housing for the splines of the yoke member.

A specific object is to provide an improved type of spline shaft particularly suitable for incorporation in this assembly, the shaft being shown and described in co-pending application Serial No. 180,753, filed December 20, 1937, now Patent No. 2,161,138.

Other objects and advantages will become more fully apparent as reference is had to the accompanying drawing wherein my invention is illustrated, and in which:

Fig. 1 is a side elevation with the upper half in longitudinal section of the end of a propeller shaft and a universal joint member connected according to my invention, and Fig. 2 is a diametric section taken along the line 2—2 of Fig. 1.

More particularly 1 indicates a tubular shaft which may be the propeller shaft of an automobile into the end of which a separate part 2 has been inserted and fixed thereto as by welding at the regions 3 and 4. This part 2 is preferably a forging having a central opening 5, the side walls of which have been machined to the shape of a rectangle with rounded corners and with the sides of the rectangle splined. The internal or splined portion 5 terminates well within the outer end of part 2 at an internal cylindrical portion 6. The rear end of the part 2 has a shoulder 7 which retains an oil retaining disc 8 on the end of the part 2.

Mating with the internally splined opening 5 is a splined shaft 9 which has an exterior shaped in counterpart of the opening 5 and which extends substantially or entirely through an opening 10 of appropriate shape formed in the shank 11. Trunnion arms 12 for trunnion formations 13 of any desired type project from the shank 11. While this universal joint member has been referred to as a yoke member it may be any type of main universal joint member which coacts with a second main member 14.

The shank 11 is preferably of cylindrical exterior shape and of such size as to be able to enter the opening 6 with slight clearance. The end of the part 2 has an external shoulder at 15 to receive a retainer cup 16 for a packing 17, which restrains the loss of lubricant from the member 2.

The shaft 9 has a central bore 18 longitudinally therethrough which is closed at its outer end by a sealing disc 19 having a port 20 which constitutes a pressure relief in cases where the space between the disc 8 and the end of the shaft 9 has been filled to too great an amount of lubricant through a suitable fitting (not shown).

Various modifications and shapes will suggest themselves to one skilled in the art and I desire to be extended protection within the scope of the appended claims.

What is claimed is:

1. The combination of a shaft having a shaft end inserted therein, said end comprising a splined portion and a relatively larger cylindrical bore coaxial therewith, and a member having a splined shank mating with said splined portion, said shank having a portion of smooth cylindrical exterior of a diameter substantially corresponding to said bore traversable into said cylindrical bore during engagement of said splined portion with said splined shank.

2. The combination of a shaft having a shaft end inserted therein, said end comprising a splined portion and a relatively larger cylindrical bore coaxial therewith, and a member having a splined shank mating with said splined portion, said shank having an enlarged portion of smooth cylindrical exterior traversable into said cylindrical bore during engagement of said splined portion with said splined shank, and a dust shield mounted on the outer end of said shaft end and slidably contacting said cylindrical exterior.

3. The combination of an internally splined member having a lubricant retainer in one end thereof, an externally splined member inserted therein through the other end thereof, said externally splined member being movable in the internally splined member, said internally splined member having an enlarged chamber in said other end communicating with the splined portion thereof, and said externally splined member having a plunger portion slidable in said chamber incident to sliding movement of said externally splined member.

4. A shaft having internal splines near one end thereof terminating in spaced relation with that end, the area of the opening between said splines and said end being greater than the smallest area containing all of said splines, an externally splined member slidably received in said internal splines and having a known maximum sliding range, a universal joint member secured on the outer end of said externally splined member, and a shank portion on said universal joint member extending into said opening, said shank portion being of a cross sectional area such that it fits closely within said opening and of a length such that its end remains within said opening during sliding movement within said predetermined range.

5. A shaft having internal splines terminating in spaced relation to one end thereof, said shaft in cross sections taken between its end and the end of said splines having a circular interior and in all remaining transverse cross sections having a series of splines arranged about the interior thereof in coaxial relation with said circular interior, an internally splined universal joint member having a shank portion closely fitting within said portion having smooth walls, and an externally splined shaft slidably received in the internal splines of the first shaft and secured within the splines of the universal joint member, said externally splined shaft having a sliding range which may be predetermined, and said smooth walled portion and shank being of such length that the end of the shank remains within said portion during sliding movement within said range.

6. A tubular shaft having a comparatively short piece of relatively thicker cross section secured in one end thereof, said piece being internally splined beginning at its inner end with the splines extending the major portion of the length thereof and terminating in a relative larger cylindrical bore, an externally splined member slidably received in said internal splines and slidable through a range which may be predetermined, and an enlarged portion on said externally splined member closely fitting within said cylindrical bore, said enlarged portion and said cylindrical bore being so proportioned as to length and so relatively positioned that the end of said enlarged portion remains within said cylindrical bore during sliding movement within said range.

7. The combination of a shaft having an internally splined bore terminating in spaced relation to an end thereof, said shaft having a second bore of larger diameter than the first bore and extending coaxially from the ends of the splines of the first bore to said end of said shaft, and a member having external splines mating with the splines of the first bore, said member having a cylindrical portion of larger diameter than its splined portion, said cylindrical portion being partially traversable into the second named bore of said shaft during engagement of said splines.

8. The combination of a shaft having an internally splined portion terminating in spaced relation to an end thereof, said splines being formed in the sides of a polygon, a cylindrical bore coaxial with said splines, said bore extending between the terminal of the splines and said end of said shaft, a main universal joint member having a cylindrical shank portion and an externally splined portion extending outwardly of said shank portion, said externally splined portion mating with said internally splined portion, said shank portion projecting into said cylindrical bore and being of a diameter such that it fits closely within said bore, and an oil seal between said shaft and said shank.

9. The combination of a tubular shaft having an end piece of comparatively thicker cross section inserted therein and permanently secured thereto, said end piece having an internally splined portion terminating in spaced relation to the outer end thereof and having a cylindrical bore of larger diameter than the splined portion extending between the terminal of said internally splined portion and said outer end of said shaft, and a universal joint yoke comprising arms for bearing members and a hollow shank portion having an externally splined shaft permanently secured therein, said externally splined shaft projecting partially into said internally splined portion, said shank portion being of a diameter such that it closely fits within said cylindrical bore, said shank portion partially projecting into said cylindrical bore, and a lubricant seal between said end piece and said shank.

HERBERT A. CUTTING.